3,044,930
N-OXIDES OF HETEROCYCLIC NITROGEN COMPOUNDS AS BIRD AND RODENT REPELLENTS
Lyle D. Goodhue, Bartlesville, and Kenneth E. Cantrel, Dewey, Okla., assignors to Phillips Petroleum Company, a corporation of Delaware
No Drawing. Filed Dec. 8, 1960, Ser. No. 74,447
18 Claims. (Cl. 167—46)

This invention relates to repelling birds and rodents. In one of its aspects, this invention relates to a method for repelling birds and rodents. In another of its aspects, this invention relates to novel bird and rodent repellent compositions. In still another of its aspects, this invention relates to a method for protecting attractant materials, such as growing plants and other materials normally consumed as food by birds and rodents. In still a further aspect, this invention relates to a method for clearing an area of birds and rodents.

This application is a continuation-in-part application of our copending application having Serial No. 827,721, filed July 17, 1959, now abandoned.

A number of repellents for certain pests have been developed and are known in the art. However, very little success have been attained in the search for a material which is repellent to birds and rodents. It is desirable for many applications to repel birds and rodents from certain areas and surfaces. For instance, the loss of grain and seeds at the present time because of the consumption by birds represents a large financial loss in this country each year. Also, as is well known, many birds are architectural pests. Furthermore, birds near airports create additional hazards for aircraft landing and taking off.

The problem of attack of growing trees and other nursery stock, as well as certain plants, by rodents has become serious in many localities. In many instances, the problem is also very serious in buildings and warehouses which are used for storage of various products, particularly grain. Any material which has a repellent action toward rodents would be highly useful when applied to materials which are subject to attack by rodents.

Accordingly, it is thus an object of this invention to provide an improved method for repelling birds and rodents.

It is another object of this invention to provide a method for rendering materials and surfaces repellent to birds and rodents. It is still another object of this invention to provide a composition for repelling birds and rodents. Another object of this invention is to protect growing plants and other materials normally consumed as food by birds and rodents.

A still further object of this invention is to provide a method for clearing an area of birds and rodents.

Another object of this invention is to provide bird "anti-flying" compositions.

Other aspects, objects and the several advantages of this invention are apparent from a study of this disclosure and the appended claims.

According to the present invention, we have discovered that birds and rodents are repelled by N-oxides of heterocyclic nitrogen-containing compounds having the structural formulas selected from

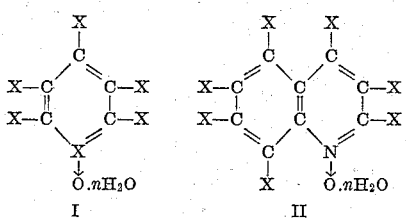

and

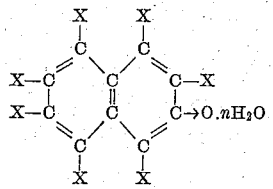

wherein X is selected from the group consisting of hydrogen, chlorine, bromine, alkyl and alkoxy radicals containing from 1 to 4 carbon atoms and aralkoxy radicals containing from 7 to 10 carbon atoms, inclusive, and nitro radicals; and wherein $n$ is selected from the group consisting of 0, 1 and 2.

By the term "repellent" we means to include any effect on the birds or rodents obtained with the compounds of the invention. For example, we have found that birds are temporarily paralyzed after eating food treated with even a small amount of compounds of the invention; however, the paralyzed birds eventually recover and fly away, but other birds will not frequent the area for some time, e.g. several days, after some of their number have been paralyzed. Birds that have eaten grain, for example, treated with compounds of the invention emit cries with the effect of driving away or warning other birds in the area of danger. Also, we have found that the compounds of the invention are very effective "anti-flying" agents in that birds that have eaten even a very small amount of the compounds of the invention are unable to fly for some time, e.g. up to several days, and during this time the birds also emit warning cries to other birds in the area. Therefore, areas such as airports can be kept cleared of birds by treating the area with compounds of the invention and thus minimize the hazard of birds flying into the path of aircraft landing at and taking off from airfields.

Representative and specific N-oxides of heterocyclic nitrogen-containing compounds of the above-described general structural formulas which can be employed according to the practice of the present invention are:

Pyridine-N-oxide
Quinoline-N-oxide
Quinoline-N-oxide dihydrate
4-methoxy-pyridine-N-oxide
4-nitro-2-methyl-5-ethylpyridine-N-oxide
2,3-diethoxyquinoline-N-oxide
4-chloropyridine-N-oxide
2,3-dimethyl-4-chloroquinoline-N-oxide monohydrate
2,3,4,5-tetrachloro-6-n-butylpyridine-N-oxide
2-n-butyl-4-bromo-7-n-butoxyquinoline-N-oxide
2-chloro-3-n-propoxy-4,5-diethylpyridine-N-oxide
2-methyl-5-ethyl-6-nitropyridine-N-oxide
5,6,7,8-tetraethyl-2,4-dinitroquinoline-N-oxide dihydrate
2-bromo-3-ethoxy-4-methyl-5-nitropyridine-N-oxide
4-benzyloxypyridine-N-oxide
3-(2-phenylethoxy)quinoline-N-oxide dihydrate
4-(3-phenyl-n-butoxy)pyridine-N-oxide
4-nitropyridine-N-oxide
4-nitro-3-methylpyridine-N-oxide
4-nitro-2-methylpyridine-N-oxide
2,4-dinitropyridine-N-oxide
2-nitropyridine-N-oxide
Isoquinoline-N-oxide
3-chloroisoquinoline-N-oxide monohydrate
5-nitroisoquinoline-N-oxide
3,4-dimethyl-5-ethoxyisoquinoline-N-oxide dihydrate The compounds of the present invention can be applied for their intended purpose as a concentrate, or in combination with a carrier or other inert materials. Solvent or adjuvant carriers employed should be substantially inert with respect to the active repellent compound. Some examples of specific carrier materials which can be employed are acetone, deodorized kerosene, naphthas, isoparaffinic hydrocarbon fractions boiling in the range of about 260 to about 800° F. (Soltrol) and the like. If desired, the repellents of this invention can be applied as aqueous emulsions by employing a suitable emulsifying agent. It is also within the scope of this invention to employ mixtures of the N-oxides of heterocyclic nitrogen-containing compounds and to employ mixtures of one or more of these compounds with other known repellents.

Also according to the invention, the heterocyclic nitrogen-containing N-oxide compounds described above and used in the method of this invention can be composited with solids to provide novel repellent compositions. The solids, for example, can comprise soil, sand, clays, seed, grain, and generally various adsorptive solids preferably in subdivided form. The repellent compounds of this invention can also be applied to surfaces or areas from which it is desired to repel birds and rodents in conjunction with an adhesive for longer life on the surface.

The repellent compounds of this invention can be applied in the above described forms by spraying, brushing, dusting, and the like. One preferred method of application is to spray a liquid composition containing these repellents onto the surface from which birds and rodents are to be repelled. When the repellents are applied in a solvent or adjuvant carrier, the liquid compositions normally contain from about 0.1 to about 10 weight percent of at least one of the above described N-oxides, although concentrations above and below this range can be effectively employed. When the repellent is applied in the form of a dust, the concentration of N-oxides employed is usually within the range of from about 1 to about 20 weight percent.

The repellents of this invention are usually applied to a surface from which birds and rodents are to be repelled in a manner so as to deposit an amount within the range between about 0.5 and about 100 grams of the active repellent material per 100 square feet of surface, preferably between about 5 and about 25 grams on the same basis. Larger or smaller amounts, however, can be applied, if desired, although larger amounts are generally uneconomical.

When the repellents of the present invention are applied to feed, seeds, grain, or other materials normally consumed as food and the like, from which birds and rodents are to be repelled, application is made so as to deposit between about 0.05 and about 5 weight percent, based on the feed, seeds, or grain of the active repellent. The more preferred range is from about 0.1 to about 2 weight percent.

It has been observed that true repellency is attained with both birds and rodents with the higher dosages or concentrations set forth above. It has been observed that birds and rodents will not eat materials treated with compounds of the invention in the higher concentrations. However, it has been further observed that birds and rodents will eat materials treated with compounds of the invention in the lower concentrations and, as a result of eating a small amount of the compounds, the birds are unable to fly and at the same time emit warning cries to other birds in the area. However, if the birds or rodents consume too much of the compounds, death results. For example, it has been determined that the lethal dose for rats is approximately 100 milligrams of repellent compound per kilogram of treated material, whereas a lethal dose for sparrows is approximately 20 milligrams per kilogram.

The repellents, compounds, or materials of the present invention can be prepared by any suitable method known in the prior art. The novel repellent N-oxide compounds of our invention described above can be obtained by converting a suitable intermediate pyridine compound, for example, having a substituted group or groups which may be readily replaced, to the corresponding N-oxide, by reacting the substituted pyridine compound, a glacial acetic acid solution, with hydrogen peroxide and then converting the pyridine-N-oxide to the substituted compounds described above.

The repellent compounds of the present invention can be applied to many different types of surfaces and materials which it is desired to render repellent and protect against the ravages of birds and rodents, as explained above. For example, these materials can be applied to window ledges, buildings, fences around areas such as airports, feed, seed, grain, fruit trees, tree seedlings, or other attractant materials normally consumed as food and the like. For example, when paper or cloth bags used as containers for attractant materials normally consumed as food by rodents or birds are impregnated with a compound of the invention, an effective barrier is provided which prevents entrance of rodents or birds to the material contained therein. Also it can be incorporated into gum rosin or similar adjuvant and applied as a protective coating for fruit trees.

In rendering seeds, feed, or grain repellent to birds and rodents these may be coated or impregnated with the active materials by immersing or soaking the seeds, feed, or grain in a solution containing a heterocyclic nitrogen-containing N-oxide compound prior to distribution or planting. The materials of the present invention are well adapted for treating seeds. Thus, in actual practice seeds or grain which are to be planted in fields, for example, or otherwise distributed, are first treated with at least one of the active materials of the present invention and then the treated seeds or grain are planted or otherwise distributed. For example, treated seeds or grains can be distributed in pans or otherwise, in rural areas, industrial areas, air traffic areas, and the like, to keep the area substantially free of birds or rodents.

The following examples illustrate the effectiveness of the compounds of the present invention but are not intended to limit the scope of the invention.

EXAMPLE I

A run was made in which 4-nitro-2-methyl-5-ethyl-pyridine-N-oxide was tested as a repllent for baby chickens. In this run, a solution of ½ gram of this compound in 20 cc. of acetone was applied to 50 grams of chicken feed. The chicken feed was thoroughly mixed with this solution, after which the acetone was evaporated from the feed. Fifty grams of the treated feed was then placed in a cage with two hungry baby chickens, and the number of grams of treated feed which was consumed after three days was determined. Untreated feed was completely consumed before the end of the first day. The result of this run is expressed as Table I.

*Table I*

| Compound Tested | Grams Treated Feed Eaten | | |
| --- | --- | --- | --- |
| | Estimated | | Actual |
| | 1st Day | 2nd Day | 3rd Day |
| 4-nitro-2-methyl-5-ethylpyridine-N-oxide | 15 | 20 | 19 |

EXAMPLE II

A series of runs was carried out in which several of the compounds of this invention were tested as repellents for Coturnix quail.

In these tests, 100 grams of feed were treated with a solution of 1 gram of one of the N-oxides of heterocyclic nitrogen compounds of this invention in 40 cc. of acetone. The solvent was then evaporated, and then dried feed was placed in a cage with four Coturnix quail. As in Example I, the amount of feed consumed on the first and second days are estimated, and the amount consumed after three days was determined by weighing, unless all of the feed had been etaen. The quail ate all of the 100 grams on the first day when untreated feed was used. The results of these runs are expressed below as Table II.

*Table II*

| Compound Tested | Grams Treated Feed Eaten | | |
|---|---|---|---|
| | Estimated | | Actual |
| | 1st Day | 2nd Day | 3rd Day |
| Pyridine-N-oxide | 5 | 45 | 47 |
| Quinoline-N-oxide dihydrate | 5 | 10 | 30 |
| 4-methoxypyridine-N-oxide | 5 | 10 | 54 |
| 4-nitro-2-methyl-5-ethylpyridine-N-oxide | 10 | 12 | 43 |
| 4-benzyloxypyridine-N-oxide | 10 | 12 | 43 |
| 4-nitro-3-methylpyridine-N-oxide | 5 | 5 | 17 |
| 4-nitro-2-methylpyridine-N-oxide | 10 | 30 | 52 |

In the above examples, it should be emphasized the test is a very severe one, much more so than one where a choice of treated or untreated seed is given. It is obvious from Example II that the repellents are very good ones since very little feed was consumed by these voracious eaters over a three day period under starving conditions.

EXAMPLE III

A series of tests were carried out in which pans of treated and untreated grain were exposed to birds on the roof of a house situated in a municipal area heavily frequented by sparrows, pigeons and other species of birds.

In these tests, 340 grams of sorghum grain were treated with a solution of 3.4 grams of the compound to be tested dissolved in 30 cc. of acetone. The solvent was then evaporated off, and the treated grain was placed in pans in the above-described location. An equal number of pans containing the same amount of untreated grain was exposed in the same location, and daily readings were taken on the amount of the feed which had been consumed by the birds. The readings were taken by measuring the feed which had been consumed by the birds. The readings were taken by measuring the volume of grain in milliliters which remained in the pans each day. Since the untreated grain was eaten very rapidly, it was necessary to replenish the untreated grain a number of times. The results of these runs are expressed below in Table III.

In this table, the results are expressed as percent repellency. This percent is calculated by the equation Percent repellency $= 100 - \left[\frac{\text{Volume treated feed eaten in 14 days}}{\text{Volume untreated feed eaten in 14 days}}\right] 100$

*Table III*

Compound: Percent repellency
4-chloropyridine-N-oxide _____ 92.7
4-nitropyridine-N-oxide _____ 97.9

EXAMPLE IV

A series of tests was carried out in which pans of treated and untreated grain were exposed to birds in the field in a rural area frequented by field birds.

The grain was treated by applying an acetone solution of the repellent to the grain in an amount sufficient to yield the indicated weight percent and thereafter evaporating off the diluent. The tests were carried out by first baiting the birds into the field with untreated grain for a sufficient length of time until the birds were consuming all of the grain in the pans in one day's time. When this point was reached, 75 grams of the treated grain were placed in each pan, and these pans of treated grain were arranged at random spots throughout the field. Pans of untreated grain were interspersed with the treated grain and also placed around the edge of the field. The values given for percent consumed were on a one day basis. Under the same conditions, the treated grain was completely consumed by the birds. The results of these tests are expressed below in Table IV.

*Table IV*

| Compound | Wt. percent of compound on grain | Number of Tests | | Avg. Amt. of grain eaten, wt. percent |
|---|---|---|---|---|
| | | Tests | Total pans | |
| Pyridine-N-oxide | 1.0 | 3 | 3 | 16 |
| Quinoline-N-oxide dihydrate | 1.0 | 3 | 3 | 11 |
| 4-methoxypyridine-N-oxide | 1.0 | 2 | 4 | 50 |
| 4-methoxypyridine-N-oxide | 0.25 | 2 | 3 | 78 |

It can be seen from the above tabulated data that both pyridine-N-oxide and quinoline-N-oxide dihydrate were very effective bird repellents.

EXAMPLE V

Several runs were carried out in which various N-oxides of heterocyclic nitrogen compounds were tested as repellents for rabbits.

In these runs, young rabbits were fed pelletized commercial rabbit food until they became accustomed to their surroundings. At this time, the animals were then offered 100 grams of feed which had been impregnated with a 1 percent solution of the compound in acetone. Sufficient solution was employed to provide 0.05 gram of the compound per 100 grams of feed. The amount of treated feed which had been eaten at the end of the first and second days was estimated and the actual amount which had been eaten after three days was determined by weighing. If the chemical has little or no repellency, the feed is often consumed on the first day. The results of these tests are expressed below in Table V.

*Table V*

| Compound | Percent Consumed | | |
|---|---|---|---|
| | Estimated | | Weighed |
| | 1st Day | 2nd Day | 3rd Day |
| 4-Nitropyridine-N-oxide | 0 | 0 | 7 |
| 4-Nitro-2-methyl-5-ethylpyridine-N-oxide | 10 | 20 | 24 |
| 4-Chloropyridine-N-oxide | 5 | 10 | 56 |

EXAMPLE VI

In another run, 4-nitropyridine-N-oxide was tested as a repellent for rats. In this run, dog food (checkers) was dipped in a 1 percent acetone solution of 4-nitropyridine-N-oxide, after which the acetone was evaporated off. One large rat was given 100 grams of this treated food. After three days the rat had consumed 9 grams, and 40 grams after 6 days. During the test, no other food was available to the rat. In tests wherein untreated food is also supplied, little if any of the repellent treated food is eaten.

EXAMPLE VII

In one test, white kaffir corn was treated with an aqueous solution of 4-nitropyridine-N-oxide in an amount so as to provide ½ percent by weight of the compound on the grain. One quart of this treated grain was then placed in small piles (approximately 2 inch diameter) at random locations in and around a 5 to 6 acre plot of wheat. Just prior to setting out this material, an estimated 5,000 to 7,000 birds were observed feeding in the wheat plot. These birds consisted mostly of blackbirds, cowbirds, and sparrows. Four days later, only 10 to 20 birds could be counted in the wheat plot at any one time. It was further observed that many birds were on the ground, unable to fly, in wooded areas just adjacent to the wheat plot. Many of these birds, particularly the cowbirds, were emitting cries with the effect of driving away or warning birds of danger in the area.

EXAMPLE VIII

In another test, sorghum grain containing 1 percent by weight of 4-nitropyridine-N-oxide was placed in pans on the roof of a house in a residential area frequented by sparrows and pigeons. Five days after the grain was placed in this location a pigeon was found near the house in a condition such that he was unable to fly. Subsequent to this, pigeons stopped frequenting the area where the grain had been set out. The pigeon which had been affected by eating the grain recovered the next day and was released.

EXAMPLE IX

In still another test, shelled corn was treated with an aqueous solution of 4-nitropyridine-N-oxide in an amount sufficient to provide ½ percent by weight of the compound on the corn. This treated corn was placed in pans on an office building frequented by pigeons. Within 2 to 3 days pigeons stopped frequenting the building where the grain was placed.

EXAMPLE X

In still another test bread and fish were treated with 4-nitropyridine-N-oxide, after which the treated food was set out in an area frequented by sea gulls. Prior to setting out the treated food, untreated bread and fish were scattered along the beach and on a dock frequented by an estimated 600 to 700 sea gulls. The treated bread contained 2 percent by weight of the repellent material, while the frozen fish were treated by rolling the fish in bread crumbs containing 1 percent by weight of the repellent compound.

The treated food was rapidly consumed by the gulls, and after some time, it was noted that many of the gulls were experiencing difficulty in flying. It was further noted that a single gull emitted a distress cry whch caused the gulls who were still able to fly to leave the area. The following morning, many gulls were found on the beach in a condition such that they could not fly. Four days after the treated food was set out, it was estimated that a maximum of 30 gulls were present in the area in and around the dock.

Reasonable variation and modification are possible within the scope of the foregoing disclosure and the appended claims to the invention, the essence of which is that it has been found that N-oxides of heterocyclic nitrogen-containing compounds of the structural formulas described are effective for controlling and combatting pests such as birds and rodents.

We claim:

1. A method for protecting growing plants and other materials normally consumed as food by birds and rodents which comprises treating said plants and other materials with an N-oxide of a heterocyclic nitrogen-containing compound having a structural formula selected from and wherein X is selected from the group consisting of hydrogen, chlorine, bromine, alkyl and alkoxy radicals containing from 1 to 4 carbon atoms and aralkoxy radicals containing from 7 to 10 carbon atoms, inclusive, and nitro radicals, and wherein $n$ is selected from the group consisting of 0, 1, and 2.

2. A method according to claim 1 wherein said compound is pyridine-N-oxide.

3. A method according to claim 1 wherein said compound is quinoline-N-oxide dihydrate.

4. A method according to claim 1 wherein said compound is 4-chloropyridine-N-oxide.

5. A method according to claim 1 wherein said compound is a 4-methoxypyridine-N-oxide.

6. A method according to claim 1 wherein said compound is 4-benzyloxypyridine-N-oxide.

7. A method according to claim 1 wherein said compound is 4-nitro-2-methyl-5-ethylpyridine-N-oxide.

8. A method of according to claim 1 wherein said compound is 4-nitropyridine-N-oxide.

9. A method for clearing an area of birds and rodents which comprises treating bird and rodent food with an effective amount of at least one compound having a formula selected from and wherein X is selected from the group consisting of hydrogen, chlorine, bromine, alkyl and alkoxy radicals containing from 1 to 4 carbon atoms and aralkoxy radicals containing from 7 to 10 carbon atoms, inclusive, and nitro radicals, wherein $n$ is selected from the group of 0, 1, and 2, and then distributing said food in an area from which birds and rodents are to be cleared.

10. A method according to claim 9 wherein said compound is pyridine-N-oxide.

11. A method according to claim 9 wherein said compound is quinoline-N-oxide dihydrate.

12. A method according to claim 9 wherein said compound is 4-chloropyridine-N-oxide.

13. A method according to claim 9 wherein said compound is 4-nitro3-methylpyridine-N-oxide.

14. A method according to claim 9 wherein said compound is 4-benzyloxypyridine-N-oxide.

15. A method according to claim 9 wherein said compound is 4-nitro-2-methyl-5-ethylpyridine-N-oxide.

16. A method according to claim 9 wherein said compound is 4-nitropyridine-N-oxide.

17. A method of repelling birds and rodents which comprises treating a locus from which birds and rodents are to be repelled with a heterocyclic nitrogen, containing N-oxide compound of the formula

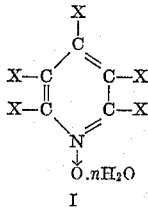 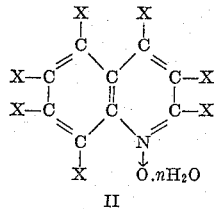

and

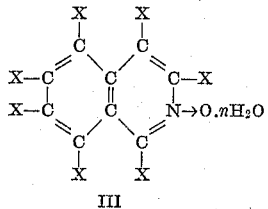

Wherein X is selected from the group consisting of hydrogen, chlorine, bromine, alkyl and alkoxy radicals containing from 1 to 4 carbon atoms and aralkoxy radicals containing from 7 to 10 carbon atoms, inclusive, and nitro radicals, and wherein $n$ is selected from the group consisting of 0, 1, and 2.

18. A method of repelling birds which comprises subjecting a bird to the action of at least one heterocyclic nitrogen-containing N-oxide compound of the formula

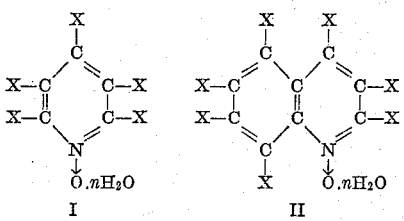

and

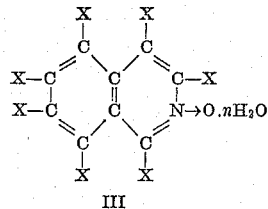

wherein X is selected from the group consisting of hydrogen, chlorine, bromine, alkyl and alkoxy radicals containing from 1 to 4 carbon atoms and aralkoxy radicals containing from 7 to 10 carbon atoms, inclusive, and nitro radicals, and wherein $n$ is selected from the group consisting of 0, 1, and 2.

References Cited in the file of this patent

UNITED STATES PATENTS 2,922,792     Rockett _____ Jan. 26, 1960

FOREIGN PATENTS 1,013,113     Germany _____ Aug. 1, 1957

OTHER REFERENCES

Bellack et al.: Relationships Between Chemical Structure and Rat Repellency, Chemical-Biological Coordination Center, Review No. 5, May 1953, pub. by National Research Council, Wash., D.C., pages 108 and 109.

UNITED STATES PATENT OFFICE
CERTIFICATE OF CORRECTION

Patent No. 3,044,930                              July 17, 1962

Lyle D. Goodhue et al.

It is hereby certified that error appears in the above numbered patent requiring correction and that the said Letters Patent should read as corrected below.

Column 1, formula I, lines 69 to 71, for the lower part of the formula reading :

$$\overset{X}{\underset{\downarrow}{O}}\cdot nH_2O \quad\quad \text{read} \quad\quad \overset{N}{\underset{\downarrow}{O}}\cdot nH_2O$$

column 2, line 6, formula III, for the right-hand portion of the formula reading:

$$C \longrightarrow O \cdot nH_2O \quad\quad \text{read} \quad\quad N \longrightarrow O \cdot nH_2O$$

Signed and sealed this 19th day of March 1963.

(SEAL)
Attest:

ESTON G. JOHNSON
Attesting Officer

DAVID L. LADD
Commissioner of
Patents